Feb. 16, 1943.　　　C. J. LAUER　　　2,311,402
SUN VISOR
Filed June 5, 1941

Inventor
Carleton J. Lauer
By Blackmore, Spence, & Hint
Attorneys

Patented Feb. 16, 1943

2,311,402

UNITED STATES PATENT OFFICE 2,311,402

SUN VISOR

Carleton J. Lauer, Flint, Mich., assignor to General Motors Corporation, Detroit, Mich., a corporation of Delaware Application June 5, 1941, Serial No. 396,706

1 Claim. (Cl. 296—97)

This invention relates to automotive vehicles and has particular reference to a structure to reduce the amount of sunlight entering through the windshield and to protect the driver's eyes from direct sunlight when the vehicle is moving toward the sun.

The modern automotive vehicle is equipped inside over the upper edge of the windshield with adjustable sun shades which may be lowered to protect the driver's eyes when driving against the sun. One shade is provided at each side of the vehicle, and these shades are swingable to the sides of the vehicle to protect the occupants of the front seat when the sun is coming from the side. The rear view mirror is positioned at the upper center of the windshield and when the sun shades are in lowered position they are sufficiently short to prevent them from covering the rear view mirror. There is therefore a space between the sun shades and over the mirror in which the sun enters and causes an unpleasant effect on the eyes of the driver. The present invention overcomes this difficulty by making a projection at the center of the roof which projection extends downwardly into the windshield and covers the space between the top of the rear view mirror and the top center of the windshield. When the sun shades are in the lowered position they will extend to the lateral edges of the mirror, and with the extension on the top covering the light opening between the top of the mirror and the top of the windshield, there will be a complete coverage to prevent excess sunlight reaching the eyes of the driver.

On the drawing—

Figure 1:
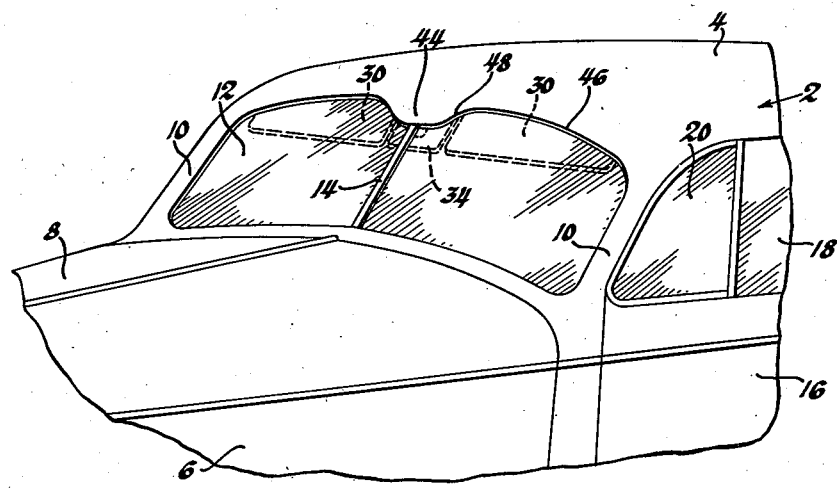
Figure 1 is a more or less perspective view of the vehicle showing the invention applied.

Referring to the drawing, the numeral 2 indicates an automotive vehicle as a whole. The vehicle has the usual metal top 4, the hood side 6, the hinged hood 8, the windshield posts 10, the windshield 12 which is divided at its center by a rib 14, and the front door 16 having the usual raisable and lowerable window 18 and the ventilating window 20.

Inside the vehicle brackets 24 are secured at each side and these brackets have secured thereto a socket 26 in which there is secured a rod 28 having attached thereto the sun shades 30. The sun shade is capable of being moved from the positions shown in Figures 1 and 2 through an angle of 90° to move it upward more or less flatwise against the roof 4 and out of the way. The sun shade 30 and the bar 28 are also capable of being swung laterally against the windows 18 and 20 in a well known way to shield the eyes of the driver when the sun comes through the door window 18 and ventilating window 20.

The sun shades end adjacent each other as indicated at 32 and in the space between the ends 32 the usual rear view mirror 34 is positioned.

Figure 2:
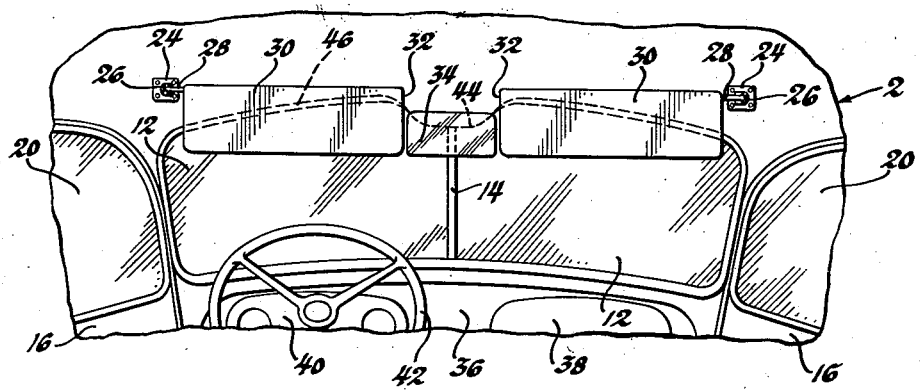
Figure 2 is an inside view of the vehicle looking out of the windshield and showing the invention as it appears from the inside of the vehicle.

In Figure 2 the instrument panel is indicated at 36, the glove compartment at 38, and the instrument cluster at 40. The usual steering wheel is indicated at 42.

The parts so far described are in general conventional and per se form no part of the invention.

The novel part of the invention consists in the integral extension of projection 44 formed at the front edge 46 of the roof 4. The extension 44 is positioned at the center of the roof and at the center of the frame of the usual windshield 12 and extends downwardly into the windshield frame to cover the space between the ends 32 of the sun shades 30 and the top of the rear view mirror 34. By referring to Figure 2 it will be apparent that if the extension 44 were not provided there would be an opening above the windshield through which the sunlight would be able to penetrate and reach the eyes of the driver behind the steering wheel 42. This has been objectionable in driving against the sun, and by shielding the space between the mirror 34 and the abutting ends 32 of the sun shades the objection of excess sunlight and danger to driving is avoided.

The extension 44 is shown as rounded at its sides at 48 but, if desired, the rounded part may be more or less squared to cover the space above the mirror 34.

I claim:

In an automotive vehicle having a windshield and a top and being provided with sun shades adjacent the windshield interiorly of the vehicle and with a rear view mirror positioned between the adjacent ends of the sun shades, and a projecting part on the top extending downwardly of the windshield into the space between the ends of the sun shades and the upper part of the mirror.

CARLETON J. LAUER.